July 9, 1935.                    C. A. GLOCK                    2,007,715
                           VEHICLE ACTUATED SIGNAL
                             Filed March 24, 1933
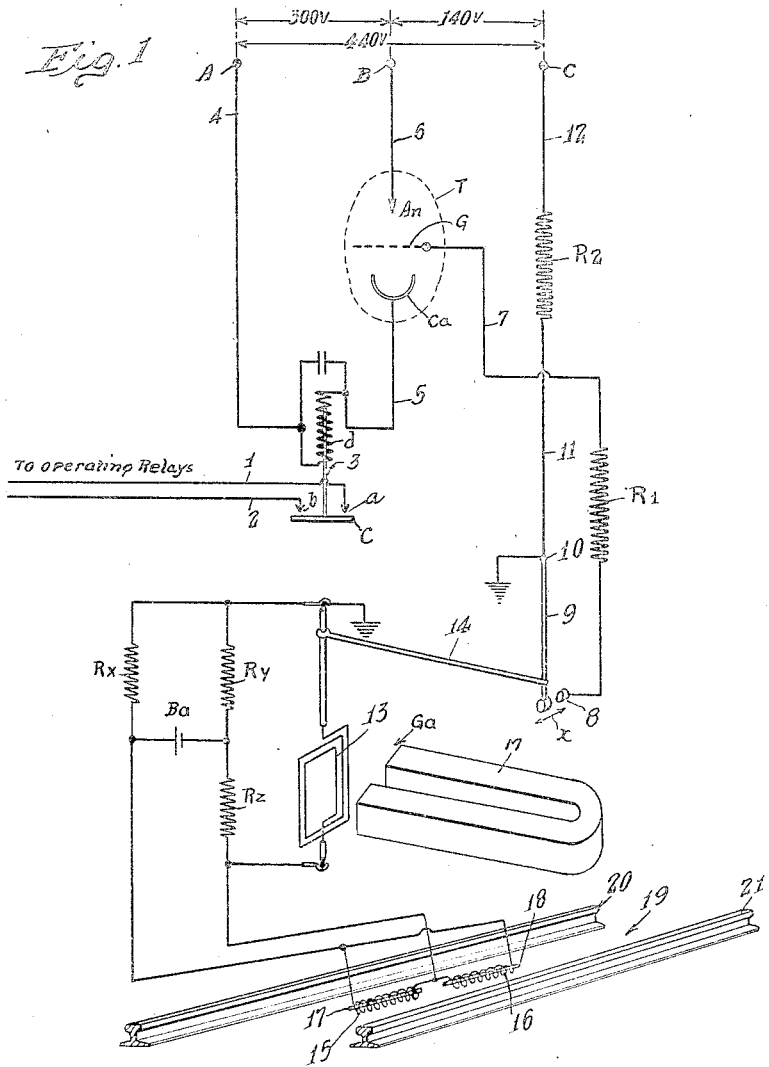
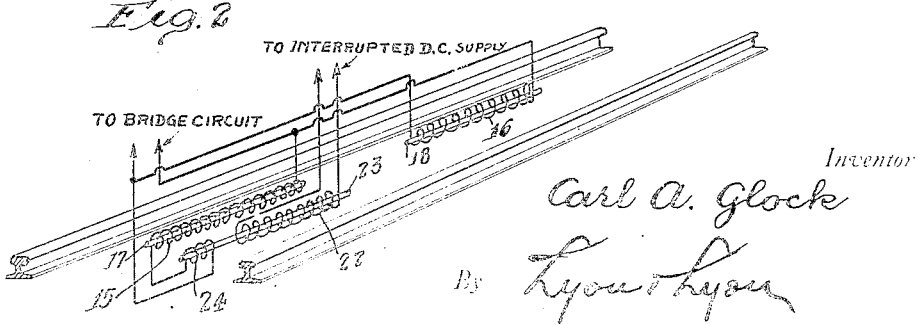
Inventor
Carl A. Glock
By Lyon & Lyon
Attorneys Patented July 9, 1935

2,007,715

UNITED STATES PATENT OFFICE 2,007,715

VEHICLE ACTUATED SIGNAL

Carl A. Glock, Lynwood, Calif.

Application March 24, 1933, Serial No. 662,465

2 Claims. (Cl. 177—329)

My invention relates to signaling systems and has particular reference to systems of the type in which the passage of a vehicle over a predetermined section of a road, or roadbed, will automatically cause operation of a signaling device.

In signaling systems denoting the approach or passage of vehicles over a predetermined section of a road, or roadbed, it is common practice to employ some device which is struck by the moving vehicle, or some other device which will be actuated by the passage of the vehicle, for the purpose of operating the signal to give the desired indication.

Most of these systems, particularly those employed in connection with railroads, employ relays which are connected to the track over which the vehicle moves in such manner that the approach or passage of a vehicle will reduce the resistance in a track circuit sufficiently to cause the relay to operate. Such device, however, is subject to derangement very readily, and requires the maintenance of battery supplies for the track circuits which are also subject to getting out of order and destroying the value of the signaling system. It has also been attempted to apply such signaling systems to vehicles, such as automobiles, passing over an ordinary road in which instance magnetic devices carried by the vehicles to operate signal switches in the roadbed, or light sensitive cells and control systems therefor have been employed, in which the beam of light will be interrupted by the passage of the vehicle over the selected section of the road. All of these devices, however, are subject to becoming out of order, and require delicate adjustments, and further require that the vehicle shall pass over a particular spot of the road in order to cause the operation of the signals.

I have discovered that a coil imbedded in the roadbed or mounted adjacent the roadbed, will be affected by the passage of a vehicle over the roadbed, probably due to the fact that vehicles are ordinarily constructed with large quantities of magnetizable material therein so that even though the coil and the vehicle may be a relatively great distance apart the passage of the vehicle with its large quantity of magnetizable material will disturb the magnetic field of the coil and induce small currents which by amplification may be employed to control signal devices.

It is, therefore, an object of my invention to utilize the effect of the passage of large quantities of magnetizable material of a vehicle adjacent a coil to control signals and signaling systems.

Another object of this invention is to provide a signal operating system which may be readily adapted either to railroads or to ordinary vehicular roads, in which the movement of the vehicle over the roadbed will cause the actuation of the signal independent of slight variations in the precise position of the vehicle as it crosses the selected section.

Another object of the invention is to provide a primary operating circuit for a signaling system of the character set forth in the preceding paragraph, which is not affected by the passage of currents in rails of a railroad when used therewith.

Another object of the invention is to provide a signaling system of the character set forth, in which the signaling circuit will be operated as effectively by the standing of the vehicle over a selected portion of the roadbed as it will by the movement of the vehicle over the roadbed.

Other objects and advantages will be apparent from a study of the following specification, read in connection with the accompanying drawing, wherein, Figure 1 is a diagrammatic view of a signal controlling system constructed in accordance with my invention; and Figure 2 is a diagrammatic view of a portion of the system shown in Figure 1, illustrating a modified form of the invention which includes a device for actuating the signaling system when the vehicle is standing over a selected section of the roadbed.

Referring to the drawing, I have illustrated herein a portion of the ordinary, well-known type of signaling system which, for purposes of illustration, may be considered as a section of the block system ordinarily employed in railway control systems. This section of block signaling systems is illustrated as including a pair of conductors 1 and 2, bearing the legend "To operating relays", the circuit for which is controlled by the usual operating relay 3 having contacts $a$ and $b$ thereon adapted to be closed by a contact piece $c$ controlled by the coil $d$ of the relay. The coil $d$ of the relay is illustrated as being connected in circuit with a suitable source of electric current supply, indicated by the terminals A, B and C, which, for the purposes of illustration herein, I have indicated as being supplied with current at a potential of 440-volts. The terminals A and B are so connected to the source of supply that there is an electric pressure between them of approximately 300 volts, while the pressure between terminals B and C is approximately 140 volts. This arrangement of connection permits the introduction into the circuit of an electrical control apparatus, such as the three-element gas discharge or grid glow tube T including an anode An and a cathode Ca and a grid G as hereinafter described.

I prefer that the circuit connections for the relay 3 shall extend from the terminal A through conductor 4, the coil d of the relay 3 and conductor 5 to the cathode Ca of the tube T and thence will extend from the anode An of the tube through conductor 6 to the terminal B. Thus, as will be hereinafter described, when an electrical discharge is produced between the anode and the cathode, sufficient current will pass through the relay, and the current will cause the relay 3 to close these contacts a, b, and thus operate the signal controlled by the relay 3.

In order to start the discharge between the anode and the cathode of the tube A, a second circuit is employed which connects the grid G of the tube T through conductor 7 and resistance $R^1$ to one contact 8 of a galvanometer switch, the other contact of which is indicated at 9 as comprising a strip of metal pivoted at 10 so that it may be moved in the direction indicated by the arrow X into and out of contact with the contact plate 8. Thence the circuit extends by way of conductor 11, through a second resistance $R^2$, and conductor 12, to the terminal C of the 440 volt source of electrical supply.

Thus it will be apparent that employing the ordinary operating characteristics of the grid glow tube T the closing of the circuit at the contacts 8 and 9 will cause a discharge between the cathode Ca and the grid G and this will be sufficient to start the discharge between the cathode Ca and the anode An.

In order to control the closing of the switch contacts 8 and 9, I have illustrated a galvanometer Ga as including the usual magnet M in the field of which operates a moving coil 13, the moving coil being connected to a needle 14 so that as the coil is moved the needle will also be moved. By mounting the needle or pointer 14 in the proper position, relative to the movable contact 9, movement of the coil 13 will cause the contact 9 to be moved into engagement with its contact 8.

An electric current of minute value may be employed to actuate the galvanometer Ga, such current being readily obtained by the induction resulting from the passage of vehicles having relatively great quantities of magnetic material therein.

As illustrated herein, the magnetizable material in the vehicle may be utilized by disposing in the roadbed an electromagnet having a coil 15 wound upon a suitable iron core 17, the coil being connected to the galvanometer so that as a vehicle passes over, or adjacent, the coil the magnetizable material in the vehicle will induce an electric current in the coil 15 sufficient to operate the galvanometer and cause it to close its contacts 8 and 9.

Since it is the usual practice in signaling systems, particularly railway signaling systems, to arrange all of the signaling apparatus to operate upon a closed circuit principle, I prefer to connect the coil 15 to the galvanometer through a Wheatstone bridge circuit to be supplied by current from a battery Ba so that if the circuit of the coil 15 becomes opened for any reason the battery Ba will supply current to the galvanometer and cause its actuation to operate the signal.

The Wheatstone bridge circuit illustrated herein includes balanced resistances Rx, Ry, and Rz, forming three legs of the bridge across which is connected the battery Ba, while the fourth leg of the bridge circuit is formed by the circuit including the coil 15 so that any current which is induced in the coil 15 will cause an unbalancing of the bridge circuit and thus cause an operation of the galvanometer.

I have also illustrated a second electromagnet including a coil 16 wound upon a suitable iron core 18, the coils 15 and 16 being preferably identical in construction and electrical characteristics and having their cores preferably arranged in spaced axial alignment with the coils 15 and 16 however wound opposite to each other so that any magnetic field which affects both coils equally will induce an equal opposite current in the two coils and thus will not cause an unbalancing of the bridge circuit. The purpose of providing the two coils 15 and 16, as stated above, is to protect my system against undesirable operation when these coils are exposed to magnetic fields other than that of a vehicle passing over the coils.

For example, when my system is used in connection with railroad signals, the coils must be placed in the roadbed adjacent the rails which are commonly employed to conduct electric current either for supplying motive power to the vehicles or for supplying signal current or other current employed in the normal operation of the railroad, and such currents flowing through the rails induces the magnetic field around these rails which would affect the coils 15 and 16, but by providing the two coils balancing each other, any magnetic field in the rails, or any other constant magnetic field to which the coils may be exposed, will affect both coils equally and will induce equally an opposite current without causing actuation of the signaling system.

However, assuming that a vehicle passes over the roadbed 19 in a direction from right to left, as viewed in Figure 1, the iron or other magnetic material upon the vehicle approaching the right-hand coil 16, will cause a magnetic disturbance at this coil before the effect of such disturbance will reach the coil 15 and an unbalancing of each circuit will occur.

Likewise, as the vehicle passes over from the coil 16 to a position over the coil 15, the coil 15 will likewise be more affected than the coil 16, and an unbalancing of the bridge circuit will occur.

It will be observed, however, that the connections between the needle 14 of the galvanometer and the contact 9 is such that current passing in one direction in the galvanometer coil 13 will cause a closing of the contact 9, while current introduced in the opposite direction will not have this effect. Thus there is an instantaneous closing of the grid circuit for the tube T which will cause the operation of the signal controlling relay 3.

By employing alternating current at the source of supply for the terminals A, B, and C, it will be understood that the operating characteristics of the grid glow tube T will cause the grid to cease its discharge as soon as the circuit at the contacts 8 and 9 is open. However, it will be understood that if direct current is employed as the source of supply, a cutoff switch should be interposed in the anode circuit to be opened when the relay 3 has been energized for the purpose of stopping the discharge of the tube.

It will thus be observed that without adding any additional structure to the vehicle, the ordinary magnetic material employed in the construction of the vehicle may be readily employed for operating the signal controlling devices.

By referring particularly to Figure 2, it will be observed that I have illustrated therein a primary controlling circuit which may be substituted for the primary controlling circuit of the system shown in Figure 1. In this form of the device, the coils 15 and 16 are employed in substantially the same relation as illustrated in Figure 1, each of these coils being wound upon its core 17 and 18 and having their cores preferably arranged in spaced axial alignment with each other. A third coil 22 is illustrated as being also disposed in the roadbed preferably adjacent one of the coils 15 or 16, and preferably having its core 23 extending parallel to the core of the associated coil 15 or 16. The coil 22 is illustrated as being connected to a suitable source of direct current which is arranged to be interrupted at intervals in any suitable manner, such connection and such supply being indicated by the legend "To interrupted D. C. supply".

The arrangement of the two coils 15 and 16 being the same as illustrated in Figure 1, and their connections and the direction of their windings being the same as illustrated in Figure 1, it will be apparent that the effect of any extraneous magnetic field, such as might be induced by current flowing in the rails, will affect both coils equally and oppositely, leaving the bridge circuit unchanged.

However, by supplying an interrupted direct current to the coil 22, a magnetic field will be created by this coil which will affect one of the coils 15 or 16 (in the form illustrated herein the coil 15) more than it does the field of the other coil.

Such energization of coil 22 would induce current in coil 15 and cause an unbalancing of the bridge circuit, and hence I provide an auxiliary winding 24 wound upon the same core as the coil 22 and connected in series relation with the coil 15. By properly selecting the characteristics of this winding 24 so arranged with respect to the coil 22, any unbalancing effect which might occur from the energization of the coil 22 may be neutralized by the auxiliary winding, but when a vehicle is standing over or close to the coils 15 and 22 the magnetic material of the vehicle will distort the magnetic field between the coils 24 and 15, thus causing current in the coil 22 to induce a current in the coil 24 not balanced by a similarly induced current in the coil 15 and this will unbalance the bridge circuit every time current is supplied to the coil 22, while the vehicle remains stationary over these coils.

Hence it will be observed that my signal controlling system is adaptable not only to moving vehicles which pass over the roadbed, but is also equally effective for vehicles standing upon a predetermined section of the roadbed.

While for purposes of illustration herein, I have disclosed my invention as applied to a railway signal, it will be apparent that the same apparatus may be effectively employed for controlling signals for other vehicles, such as automobiles, by imbedding the operating coils 15, 16, 22 and 24 in the road so that the magnetic material of a vehicle passing over the road will affect one or the other of the coils to a greater extent than the other coil, depending upon the direction of approach of the vehicle.

It will also be observed that by reason of the galvanometer arrangement, and by reason of the employment of the grid glow tube circuit, a minute magnetic disturbance in the primary control circuit will be sufficient to operate the signal so that it will not be essential for the vehicle to be in any precise position to cause the operation of the signal but the effective position of the vehicle may vary within wide limits, thus making the device practical for employment in connection with automobiles and similar vehicles.

While I have illustrated and described the preferred embodiment of my invention, it is to be understood that I do not wish to be limited to any of the details of construction shown herein, except as defined in the appended claims.

I claim:

1. In a controlling device for a roadway signaling system, a signal circuit, a relay for controlling said circuit, a pair of electromagnetic coils disposed in said roadway with their axes in alignment with each other and disposed in the direction of movement of vehicles over said roadway, said coils being wound oppositely to each other, a circuit including said coils and a galvanometer whereby magnetic fields affecting both of said coils equally will be ineffective to operate said galvanometer but the passage of a magnetized vehicle over said roadway will affect said coils unequally to operate said galvanometer, and means operably responsive to actuation of said galvanometer for controlling said relay.

2. In a controlling device for a roadway signaling system, a signal circuit, a relay for controlling said circuit, a pair of electromagnetic coils disposed in said roadway with their axes in alignment with each other and disposed in the direction of movement of vehicles over said roadway, said coils being wound oppositely to each other, a Wheatstone bridge circuit having said coils constituting one leg of said bridge circuit, a source of current connected across said bridge circuit, and a galvanometer connected across said bridge circuit whereby movement of a magnetized vehicle over said coils will induce a current in said coils unbalancing said bridge circuit, and means actuated by movement of said galvanometer when said bridge circuit is unbalanced for actuating said signal controlling relay.

CARL A. GLOCK.